Aug. 16, 1932.  R. M. GRAHAM  1,871,604
BEAD PLACING RING
Filed Nov. 15, 1930

INVENTOR
Robert M. Graham
BY
Evans & McCoy
ATTORNEYS

Patented Aug. 16, 1932

1,871,604

UNITED STATES PATENT OFFICE

ROBERT M. GRAHAM, OF AKRON, OHIO, ASSIGNOR TO THE GENERAL TIRE & RUBBER COMPANY, OF AKRON, OHIO, A CORPORATION OF OHIO

BEAD PLACING RING

Application filed November 15, 1930. Serial No. 495,857.

The present invention relates to bead placing rings adapted to be used in connection with tire building drums and particularly in connection with the tire building drums of the general type herein shown.

One object of the present invention is to provide an endless bead placing ring that carries a rigid locating shoulder for accurately positioning the bead ring relative to the tire building drum, together with means for automatically retaining the placing ring in position on the building drum and preventing dislodgment during the rotation of the drum.

Another object is to provide a bead placing ring which serves to accurately position the bead and flipper on the tire carcass.

Another object is to provide a bead placing ring which is rugged in construction and which is capable of a long period of service life under ordinary shop operation and which remains substantially free from appreciable deformation during severe usage.

A further object is to provide a bead placing ring which will deliver the bead upon the outer periphery of the drum flange and accurately locate the bead flipper closely against the shoulder of the drum flange.

The preferred embodiment of the present invention is illustrated in the accompanying drawing in which.

Figure 1:
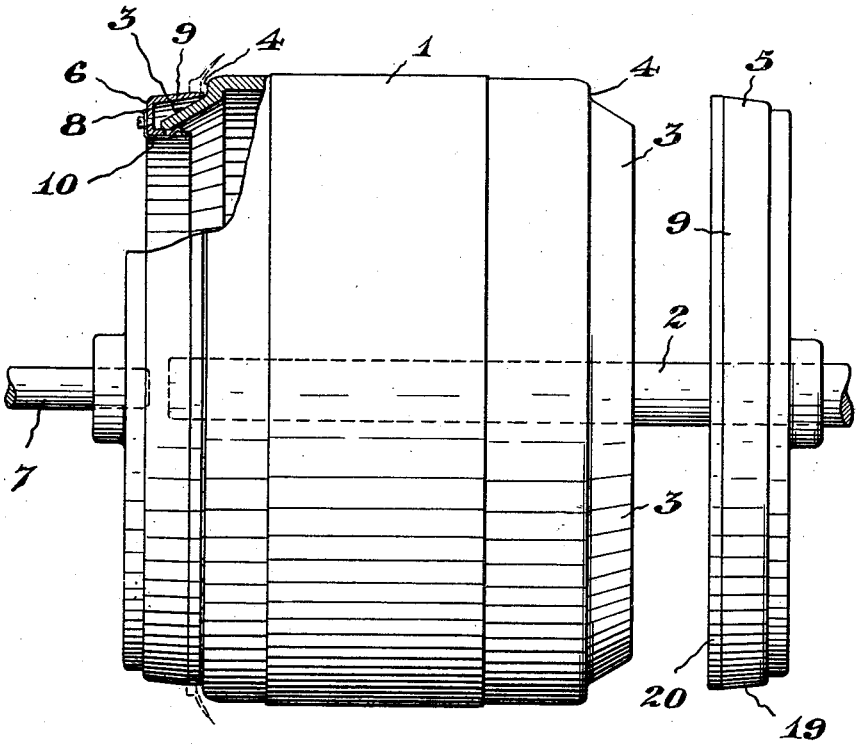
Figure 1 is a side elevation of a tire building drum, having portions of the drum and bead placing ring broken away and shown in section.

The bead seating ring of the present invention is used in connection with tire building drums and serves to carry the bead and position it properly with relation to the tire carcass during the process of making a drum-built tire.

As shown in the accompanying drawing, a tire building drum 1, mounted in the usual manner on a shaft 2, is provided with flanges at the end thereof which are offset radially inwardly with respect to the periphery of the drum to provide shoulders 4 at the ends of the periphery. The flanges 3 are continuous flanges of substantially conical form tapering outwardly from the ends of the drum. To facilitate the placing of the bead on the tire carcass being built upon the drum, a pair of bead placing rings 5 and 6 are mounted opposite the ends of the drum for movement axially into and out of engagement with the ends of the drum. The bead placing rings are mounted in any suitable manner coaxially with the drum for rotation with the drum. As herein shown, the ring 5 is mounted upon the shaft 2 of the drum to slide toward and from the ends of the drum, and the ring 6 is mounted upon a shaft 7 coaxial with the shaft 2 and movable axially of the shaft. These placing rings are identical in construction and a description of one will suffice for both.

Each of the bead placing rings is channel shaped in cross section and consists of a substantially flat web 8 and laterally projecting flanges 9 and 10. The flanges 9 and 10 are spaced radially to provide a channel between them, and the exterior flange 9 flares outwardly at a small angle from the web. Flanges 9 and 10 are continuous flanges and the interior flange 10 is of substantially cylindrical form having a radially exterior surface, which has a bevel portion 11 adjacent the outer end of the flange and a cylindrical surface 12 between the bevel portion and the web 8, which serves as a locating surface for accurately positioning the ring with respect to the drum, when the ring is moved into engagement with the drum. On the interior of the outer end of the flange 3 of the drum, there is formed an interior cylindrical locating surface 13 which fits upon the corresponding cylindrical locating surface 12 that is formed on the bead seating ring for positioning the bead seating ring coaxial with the drum, so that a bead carried on the placing ring will be concentric with the tire building drum and may be accurately positioned on the tire carcass during the process of building the tire.

The width of the channel between the flanges 9 and 10 is sufficient to accommodate the projecting flange 3 of the drum. The exterior flange 9 of the placing ring is of a length such that its edge lies closely adjacent the end shoulder 4 of the drum when the ring is secured in place on the drum.

The interior flange 10 of the bead seating ring has a series of circumferentially spaced notches 14 formed therein for receiving spring retaining members 15 which are secured adjacent the notches to the body of the ring by any suitable means such as screws 16. The spring retaining members 15 have their free ends bowed outwardly to provide rounded latching projections 17, which normally project through the notches 14 and slightly past the radially exterior surface of the flange 10, so that, as the placing ring is moved laterally into engagement with the drum, the projections 17 will ride over the locating surface 13 of the flange 3 and snap into engagement with a shoulder 18 formed on the flange 3 to the inner side of the locating surface 13 to releasably secure the placing ring in place on the end of the tire building drum.

The exterior surface of the flange 9 has a conical portion 19 which flares at a small angle from the web portion 8 to adjacent the outer end of the flange where it merges into a cylindrical seat 20 of a width to receive a tire bead ring. The tapering periphery of the placing ring facilitates the placing of the bead ring thereon. The ring bead slips upon the smaller outer side portion of the ring and may be moved laterally over the tapered portion 19 onto the seat 20.

Figures 2, 3:
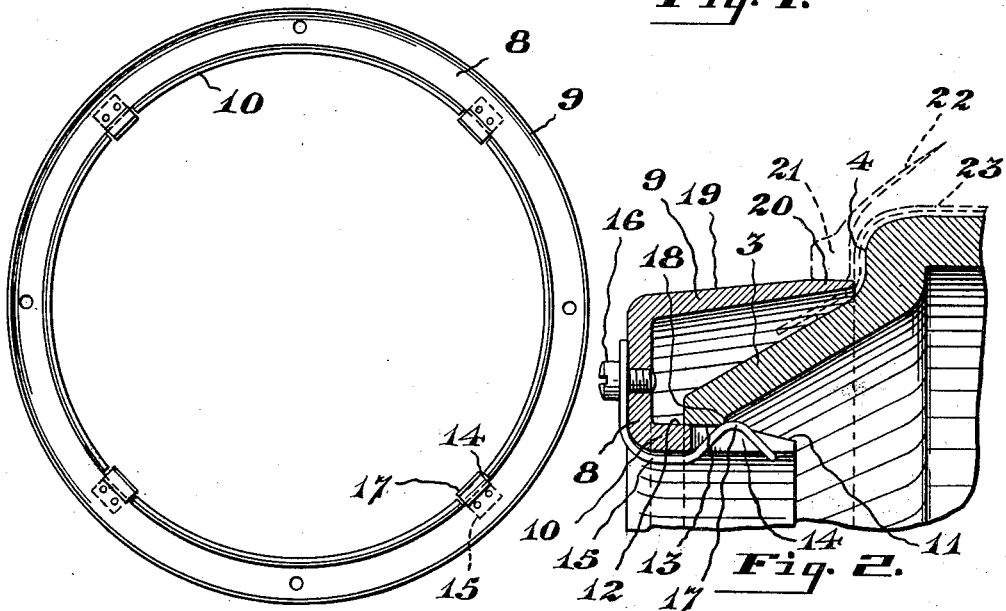
Fig. 2 is an enlarged sectional view of one of the edge flanges of a tire building drum showing a bead placing ring mounted thereon for applying a bead ring to the tire carcass.
Fig. 3 is an end elevation of the bead placing ring shown in Fig. 1, showing the spring retaining members.

In the use of the device of the present invention, the bead placing rings are first positioned outwardly of the ends of the drum and bead rings 21 with projecting flippers 22 are positioned on the seats 20 of the bead rings, as shown in Fig. 2.

After a tire carcass 23 has been built up to the desired thickness by the tire building drum, a bead placing ring, with beads thereon, is snapped into place on an end of the tire building drum to position the bead with respect to the tire carcass, as shown in Fig. 2. This accurately locates the bead concentric with the tire building drum and positions the same in proper position with respect to the tire carcass to which it is being applied.

After the bead seating ring with the bead ring carried thereby is properly positioned with respect to the carcass, the bead is forced laterally into engagement with the portion of the carcass overlying the adjacent shoulder 4 of the drum and is secured thereto by lateral pressure while the bead is positively held in coaxial relationship with respect to the carcass by the bead placing ring. The flipper 22 of the bead is then stitched to the tire carcass and the bead is then securely attached to the tire carcass and in the proper position on the tire carcass. The bead seating ring may then be removed by pulling it from the end of the tire building drum and the edge portions of the fabric plies of the tire carcass projecting inwardly past the bead are then folded up over the bead to complete the formation of the bead portion of the tire.

It will be apparent to those skilled in the art that if the tire building drum becomes out of round, or if for any reason the locating surface of the tire building drum is not truly cylindrical, then the bead placing ring will not be received by the tire building drum until the out of roundness of the drum is corrected. Likewise, if the bead placing ring is deformed in any way, it will not be received by a true tire building drum and therefore this mechanical inaccuracy must be corrected before the two parts will function.

Bead placing rings heretofore employed, of which applicant is aware, have been held in place by releasable fastening devices but have lacked the rigid locating surfaces on the drum and ring which require precise registration and which insure accurate positioning of the tire bead. Consequently, prior methods have often resulted in the formation of tires with the beads placed eccentrically with respect to the building drum surface because of some irregularity in either the bead placing ring or the tire building drum. These objectionable features of the previously proposed bead seating rings have been corrected in the present invention by providing a conveniently operating bead seating ring that has a rigid, substantially cylindrical locating face that mates with a corresponding locating face formed on the tire building drum to accurately position the bead carrying face of the bead seating ring, so that it will at all times be concentric with the building face of the tire drum.

It will be apparent that the rugged one-piece placing ring of the present invention may be employed for long periods of time in ordinary service without being subject to distortion, that when the placing ring and drum are brought into telescopic engagement and secured together, the tire bead is accurately positioned with respect to the tire carcass and is rigidly supported in such a position during the process of attaching the bead to the tire carcass.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a tire building machine, the combination with a tire building drum, of a bead placing ring mounted coaxially with the drum for movement axially into and out of engagement with an end of the drum, the drum and ring having telescopically interfitting radially rigid portions coaxial with the drum for accurately centering the ring with respect to the drum and for rigidly holding the ring and drum against relative radial movements.

2. In a tire building machine, the combination with a tire building drum provided with a laterally projecting flange at the end thereof which is offset radially inwardly from the periphery of the drum to provide a shoulder at an end of the drum for forming the bead portion of the tire carcass, of a bead placing ring mounted coaxially with the drum for movement axially into and out of engagement with the end of the ring, said bead placing ring having a substantially conical outer surface and having a substantially cylindrical bead ring seat for supporting the bead adjacent the inner side of its periphery, said bead placing ring having a rigid interior flange portion which fits telescopically within the flange of the drum.

3. In a tire building machine, the combination with a tire building drum provided with a laterally projecting flange at the end thereof which is offset radially inwardly from the periphery of the drum to provide a shoulder at an end of the drum for forming the bead portion of the tire carcass, of a bead placing ring mounted coaxially with the drum for movement axially into and out of engagement with the end of the ring, said bead placing ring having a bead ring seat for supporting the bead adjacent the inner side of its periphery, said bead placing ring having an interior portion which fits telescopically within the flange of the drum, and a resilient retaining member carried by the ring and engageable with the flange of the drum to releasably secure the ring to the drum.

4. In a tire building machine, the combination with a tire building drum having a laterally projecting flange at an end thereof which is offset radially inwardly with respect to the periphery of the drum to provide a shoulder at an end of the drum against which a bead ring may be placed, of a bead placing ring mounted coaxially with the drum for movement axially into and out of engagement with an end of the drum, said ring having an exterior annular flange whose exterior surface forms the peripheral surface of the ring, said peripheral surface having a cylindrical bead seating portion adjacent the inner side thereof, the remainder of said surface tapering from said seating portion toward the outer side of the ring, said exterior flange being of a diameter sufficient to receive the flange of the drum within it, said bead placing ring being movable to a position in which the bead ring seat is located adjacent the shoulder of the drum, said ring having an internal laterally projecting flange which has a telescopic fit within the flange of the drum.

5. In a tire building machine, the combination with a tire building drum having an outwardly projecting flange of conical form at an end thereof which is offset radially inwardly with respect to the periphery of the drum to provide a shoulder at the end of the drum against which a bead ring may be placed, of a bead placing ring having a laterally facing channel to receive the flange of the drum, the bead ring being mounted coaxially with the drum for movement axially into and out of engagement with an end of the drum, said ring having a cylindrical bead ring supporting seat on its periphery adjacent the inner edge thereof, said ring having an interior portion which has a telescopic fit within the outer end portion of the flange of the drum and a resilient retaining member carried by the ring and engageable with the flange of the drum for releasably holding the ring in place on the drum.

6. In a tire building machine, the combination with a tire building drum having a flange projecting outwardly from an end of the drum and tapering from said end, the flange being offset radially inwardly from the periphery of the drum to provide a shoulder at the end of the drum against which a bead ring may be placed, of a bead placing ring having an external flange of an internal diameter to receive the flange of the drum within it, said ring flange being provided with a bead ring seat adjacent its outer edge, said ring having an internal cylindrical flange which has a telescopic fit within the outer end portion of the flange of the drum, said cylindrical flange having circumferentially spaced notches, spring retaining members carried by the ring and extending into said notches, said retaining members being engageable with the flange of the drum to releasably retain the placing ring on the drum.

7. A bead placing ring comprising a body portion of annular form and radially spaced continuous annular flanges projecting laterally from said body portion, the outer of said flanges having an exterior surface forming the periphery of the ring, said surface being formed adjacent the outer end of the flange to provide a cylindrical bead supporting seat, said surface being tapered from said seat to the opposite side of the ring, the inner of said flanges being of cylindrical form and having circumferentially spaced notches, the radially exterior surface of the interior flange being beveled adjacent the outer end of the flange to provide a guide portion and having a cylindrical locating surface inwardly of said beveled portion, and spring retaining members attached to the ring and projecting into said notches.

8. The combination with a tire building drum of a bead placing ring comprising, a body portion of annular form having a conical guide portion whose outer surface terminates in a circumferential surface area designed to receive and support a tire bead thereon, a rigid locating face spaced radially inwardly from said guide portion and designed to receive and seat within the end of said drum, all portions of said locating face being radially rigid with respect to said body portion for rigidly locating said ring relative to the tire building drum, and a plurality of spring members carried by said ring for assisting in axially holding said ring in place on said tire building drum.

In testimony whereof I affix my signature.

ROBERT M. GRAHAM.